US009469016B2

(12) United States Patent
Cahill et al.

(10) Patent No.: US 9,469,016 B2
(45) Date of Patent: Oct. 18, 2016

(54) VERTICALLY-ORIENTED FIXTURE FOR SELECTABLY HOLDING DISSIMILAR WORKPIECES

(75) Inventors: James Patrick Cahill, Rochester, MI (US); William Peck, Grove City, OH (US); Matthew Spiewacki, Hilliard, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 1115 days.

(21) Appl. No.: 13/563,653

(22) Filed: Jul. 31, 2012

(65) Prior Publication Data

US 2013/0026691 A1 Jan. 31, 2013

Related U.S. Application Data

(63) Continuation-in-part of application No. 12/881,432, filed on Sep. 14, 2010, now Pat. No. 8,690,137.

(51) Int. Cl.

| | |
|---|---|
| ***B23Q 1/66*** | (2006.01) |
| ***B25B 11/02*** | (2006.01) |
| ***B25H 1/00*** | (2006.01) |

(52) U.S. Cl.

CPC ............. *B25B 11/02* (2013.01); *B25H 1/0007* (2013.01)

(58) Field of Classification Search

CPC ........ B23P 19/046; B23P 19/10; B23P 19/04

See application file for complete search history.

(56) References Cited

U.S. PATENT DOCUMENTS

| | | | | |
|---|---|---|---|---|
| 4,445,678 | A | 5/1984 | George | |
| 5,191,706 | A | 3/1993 | Cosden | |
| 5,398,375 | A | 3/1995 | Niederquell | |
| 5,720,817 | A | 2/1998 | Taylor | |
| 5,725,205 | A * | 3/1998 | O'Berg | B25H 1/00 269/289 R |
| 5,879,021 | A | 3/1999 | Papendick | |
| 6,101,702 | A | 8/2000 | Claycomb et al. | |
| 6,173,947 | B1 | 1/2001 | Johnson | |
| 6,185,802 | B1 | 2/2001 | Gruber et al. | |
| 6,409,128 | B1 | 6/2002 | Deshler | |
| 6,837,934 | B1 | 1/2005 | Patrykus | |
| 7,146,705 | B2 | 12/2006 | Ahti et al. | |
| 7,448,606 | B1 * | 11/2008 | Johnson | B05B 13/0285 269/16 |
| 7,988,137 | B2 | 8/2011 | Johnson | |
| 8,690,137 | B2 * | 4/2014 | Cahill | B25B 11/02 118/620 |
| 2007/0022950 | A1 * | 2/2007 | Livingston | B05B 13/0285 118/500 |

(Continued)

FOREIGN PATENT DOCUMENTS

| | | | |
|---|---|---|---|
| DE | 20219107 | U1 | 6/2003 |
| JP | 2002-292319 | A | 10/2002 |
| JP | 2003-38992 | A | 2/2003 |

*Primary Examiner* — Lee D Wilson

(74) *Attorney, Agent, or Firm* — Arent Fox LLP

(57) ABSTRACT

A fixture for selectably supporting a number of dissimilar workpieces in a substantially vertical orientation. The fixture includes a frame with one or more rotatable and vertically-oriented workpiece tooling assemblies. Each workpiece tooling assembly has multiple faces to which is mounted workpiece support tooling. The workpiece support tooling may be designed to support dissimilar workpieces, such that a single fixture may support any of a given number of workpieces by simply rotating the workpiece tooling assembly or assemblies until the corresponding support tooling is properly positioned. A locking assembly, such as a cam-locking assembly, may be provided to releasably secure each workpiece tooling assembly in the various support orientations that coincide with each of its faces.

10 Claims, 8 Drawing Sheets

(56) References Cited

U.S. PATENT DOCUMENTS

| | | | | | |
|---|---|---|---|---|---|
| 2007/0266938 | A1 | 11/2007 | Wolfer | | |
| 2008/0134970 | A1 | 6/2008 | Straccia et al. | | |
| 2008/0138532 | A1 | 6/2008 | Straccia et al. | | |
| 2009/0184217 | A1 | 7/2009 | Sprout | | |
| 2010/0186664 | A1 | 7/2010 | Ansorge | | |
| 2012/0061894 | A1* | 3/2012 | Cahill | ..................... | B25B 11/02 269/37 |
| 2013/0026691 | A1* | 1/2013 | Cahill | ..................... | B25B 11/02 269/37 |

* cited by examiner

VERTICALLY-ORIENTED FIXTURE FOR SELECTABLY HOLDING DISSIMILAR WORKPIECES

CROSS-REFERENCE TO RELATED APPLICATIONS

This application is a continuation-in-part of U.S. patent application Ser. No. 12/881,432, which was filed on Sep. 14, 2010 and is incorporated by reference herein.

TECHNICAL FIELD

The present invention is directed to a fixture for supporting a workpiece. More particularly, the present invention is directed to a fixture capable of selectably supporting a number of dissimilar workpieces.

BACKGROUND

The need to support workpieces during work thereon is well understood in various manufacturing, industrial and other settings. Depending on the particular situation, it is also well understood that a variety of dissimilar workpieces may be processed in a single location. Consequently, it has been common practice to employ work stands or similar fixtures for supporting each workpiece to be processed.

As should be apparent, particularly in large-scale manufacturing operations that process large numbers of various workpieces on a regular basis, this known practice of using workpiece-specific support fixtures can be expensive as well as space and time consuming, and also typically requires a great deal of effort when switching from one workpiece to another.

For example, vehicle manufacturing facilities that produce a number of different vehicle models will also be required to produce and/or process a number of workpieces that are unique to each vehicle. One such commonly recognizable workpiece is a front and rear vehicle bumper fascia, although there are obviously a myriad of other components that are also exemplary of this issue. In the case of a bumper fascia, there may be a number of processing steps that occur after molding, including but not limited to, gate trimming, cleaning and/or other surface treatment, and coating (i.e., primer, paint, clear coat, etc.).

As should be apparent and as would certainly be understood by one of skill in the art, each bumper fascia typically must be supported in a desired position and orientation during each aforementioned process. In the case of a coating process, for example, bumper fascias may be placed on hand-coating fixtures but, more commonly, are located on conveyor-driven fixtures that transport the fascias through an automated coating application process.

When a number of vehicles are produced at the same facility, the typical result is that a number of dissimilar bumper fascias will need to be processed by the same coating system. In a large-scale vehicle manufacturing facility, this likely means that at least hundreds of model-specific bumper fascia support fixtures must be produced and used to support the bumper fascias of an associated vehicle model during a coating operation. This also means that each time fascias for a different vehicle model are coated, all the associated fascia support fixtures must be changed. Clearly, this is an expensive and time consuming method of workpiece support. Additionally, it should also be realized that each time a given support fixture is removed, stored and subsequently reinstalled, there is the possibility that the fixture will be damaged.

In light of the foregoing commentary, the benefits of avoiding or at least minimizing the number of separate workpiece support fixtures required to process a given group of workpieces should be apparent. A workpiece support fixture of the present invention and its method of use are so directed.

SUMMARY OF THE GENERAL INVENTIVE CONCEPT

The present invention is directed to workpiece support fixtures that are capable of supporting a number of dissimilar workpieces. A workpiece support fixture of the present invention typically, but not necessarily, includes a frame having at least one vertical support member for supporting the fixture from the ground or by overhead suspension. To the vertical support member is connected a substantially vertically-oriented support frame having one or more rotatable workpiece tooling assemblies associated therewith.

The exact design of a given workpiece tooling assembly may depend on the specific workpieces to be supported thereby. Generally, however, a workpiece tooling assembly will include multiple tooling mounting faces. Each tooling mounting face of a workpiece tooling assembly includes a tooling mounting plate or similar tooling mounting structure, to which is attached support tooling for supporting a particular workpiece. A workpiece tooling assembly can be selectively rotated and locked into a support position that corresponds with a particular workpiece to be operated on.

A workpiece tooling assembly may be designed to support various numbers of different workpieces, such as for example 3-4 dissimilar workpieces. For example, a workpiece tooling assembly of the present invention may be provided with three separate but selectable tooling mounting faces, so as to support three different vehicle instrument panels. All that is required to switch support from one instrument panel to another is a simple rotation of the workpiece tooling assembly until the appropriate face and associated support tooling is properly oriented (e.g., facing the user). No actual changing of support tooling is required, as the support tooling remains with the associated face of the workpiece tooling assembly.

A single fixture of the present invention may also be equipped with multiple workpiece tooling assemblies. Further, when multiple workpiece tooling assemblies are present, there is no requirement that each workpiece tooling assembly be designed to support the same component, or set of components. For example, a fixture of the present invention may be designed with one or more pairs of workpiece tooling assemblies that respectively support one or more different instrument panels or other workpieces, or even a number of dissimilar workpieces, such as a combination of instrument panels and bumper fascias. In this manner, a variety of different workpieces may be supported on a single fixture.

As should be apparent, the use of a fixture of the present invention offers a considerable time savings in comparison to known techniques that require a complete, or substantially complete, changing of existing fixturing each time a new workpiece is to be processed. Similarly, the use of a fixture of the present invention may also offer a significant cost savings—especially in situations where a large number of dedicated fixtures are needed to accommodate manufacturing flow. This cost savings may be amplified when large numbers of several different support fixtures are required.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein.

DETAILED DESCRIPTION OF EXEMPLARY EMBODIMENT(S)

Figure 1:
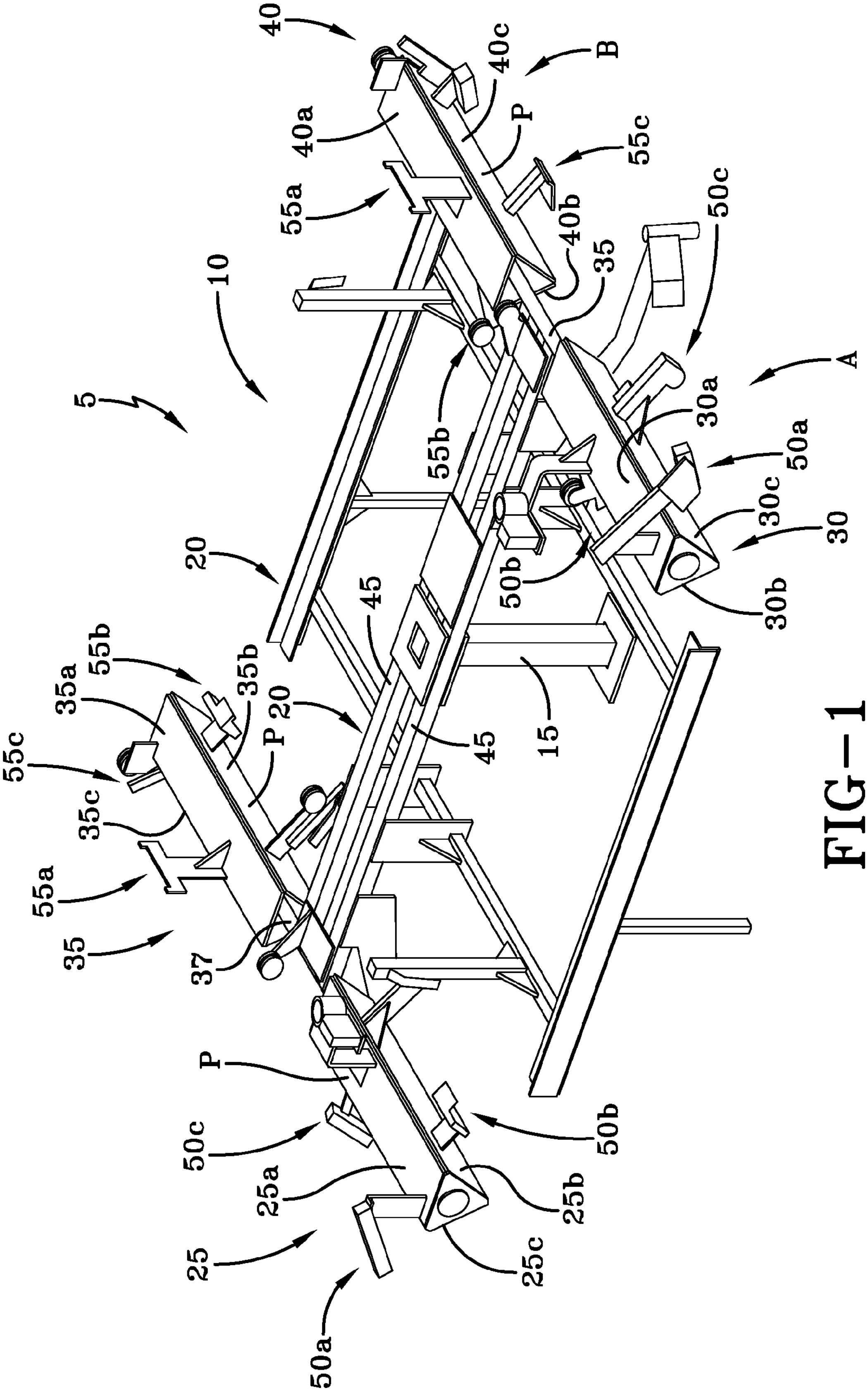
FIG. 1 is a perspective view of one exemplary embodiment of a fixture of the present invention.
Figure 2A:
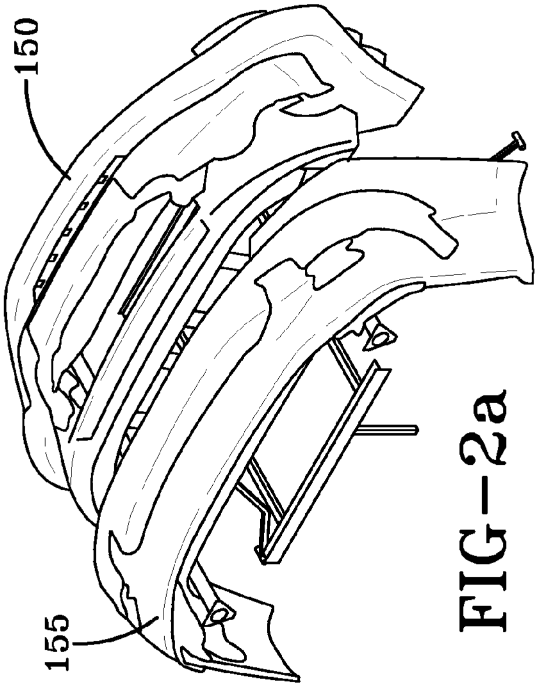
FIGS. 2*a*-2*d* are perspective, top, front and side views, respectively, showing the fixture of FIG. 1 with a pair of vehicle bumper fascias supported thereon.
Figure 2B:
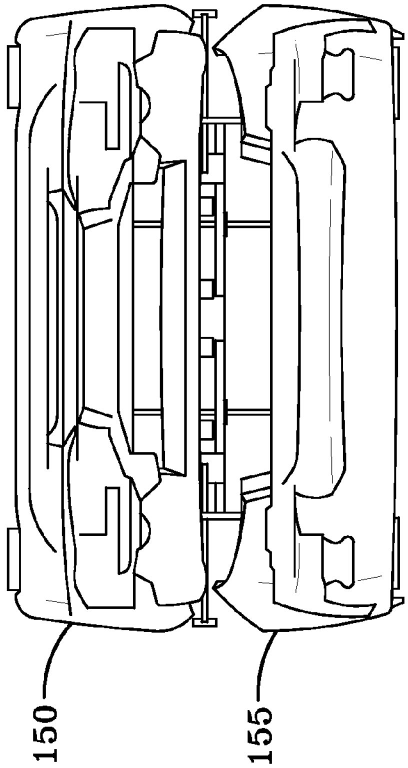
Figure 2C:
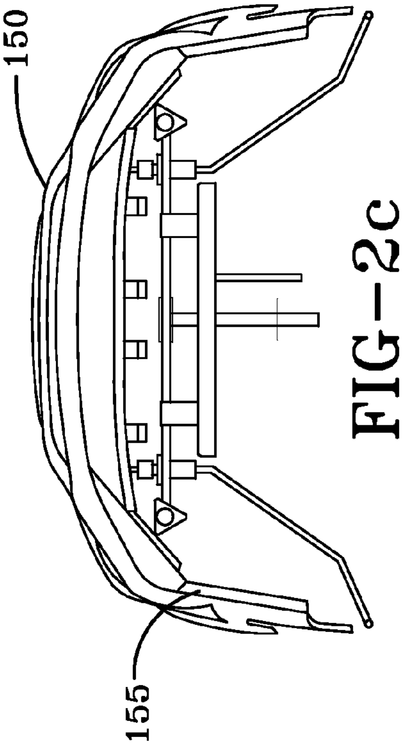
Figure 2D:
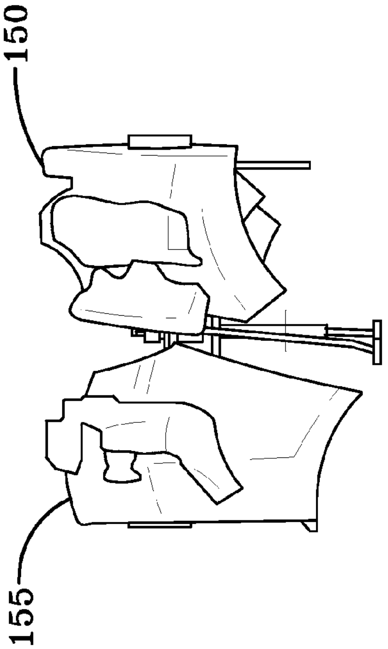

One exemplary embodiment of a fixture for selectably holding dissimilar workpieces ("fixture") 5 of the present invention is illustrated in FIG. 1. As shown, the fixture 5 includes a framework 10. As will be apparent from a complete reading of the present description, the overall framework of a fixture of the present invention may vary considerably in design, size and shape. The framework 10 of this exemplary embodiment includes a central and substantially vertical support member 15 for supporting the fixture from a floor or another structure. In an alternative embodiment, the fixture 5 may be supported by overhead suspension.

To the vertical support member 15 of this particular fixture 5 is connected a substantially horizontally-oriented support frame 20. As would be appreciated by one of skill in the art, the support frame 20 may be constructed from various materials such as metallic tubing, and angle materials. The materials used in this regard, as well as the specific method of construction and the size and shape of the support frame 20, may vary depending on the workpieces and/or application with which the fixture will be used.

The exemplary fixture 5 shown in FIG. 1 is divided into two support sections A, B, the centerline of which, in this case, essentially runs longitudinally between the support arms 45. Each support section A, B is designed to support a given workpiece (see FIGS. 2*a*-2*d*). As should be apparent, a fixture of the invention may have less than the two support sections shown in this exemplary embodiment, or may have more than two such support sections.

Each support section includes a pair of individual multi-sided, rotatable workpiece tooling assemblies 25-30, 35-40 that are supported by the framework 10. In this case, the rotatable workpiece tooling assemblies 25, 30, 35, 40 are rotatably supported on shafts 35 that extend from or through a pair of substantially horizontal and centrally located support arms 45. The support arms 45 of this design are connected to and supported by both the support frame 20 and the vertical support 15. Other fixtures of the present invention may utilize alternative rotatable workpiece tooling assembly support designs.

The pairs of rotatable workpiece tooling assemblies 25-30, 35-40 associated with each support section A, B cooperate to support a given workpiece, such as the front and rear vehicle bumper fascias 150, 155 illustrated in FIGS. 2*a*-2*d*. While bumper fascias 150, 155 are shown for purposes of illustration, it is to be understood that a fixture of the present invention is not constrained to use with any particular type of workpiece. Rather, it should be apparent that such a fixture could be used to support a variety f different types of workpieces.

Each rotatable workpiece tooling assembly 25, 30, 35, 40 of this embodiment includes three distinct tooling mounting sides (faces) 25*a*-25*c*, 30*a*-30*c*, 35-35*c*, 40*a*-40*c*. A lesser or greater number of tooling mounting faces are also possible in other embodiments. Each tooling mounting face a, b, c of the workpiece tooling assemblies 25, 30, 35, 40 of this embodiment is shown to include a tooling mounting plate P to which is attached support tooling 50*a*-50*c*, 55*a*-55*c* for supporting a particular bumper fascia. In lieu of a tooling plate, other support tooling connection elements may be provided, and the present invention is not limited to any particular support tooling connection technique.

As shown herein, the support tooling on the same tooling mounting face (e.g., the "a" face) of an associated pair of workpiece tooling assemblies 25-30, 35-40 is substantially identical but arranged in a mirrored orientation. In other embodiments of the present invention, the support tooling installed to each of an associated pair of workpiece tooling assemblies may be partially or wholly dissimilar and/or may lack the mirrored orientation depicted in FIG. 1.

In order to permit the fixture 5 to support a number (three, in this case) of dissimilar bumper fascias, each workpiece tooling assembly 25, 30, 35, 40 can be selectively rotated and locked into a support position that corresponds with a particular bumper fascia to be operated on. As can be best understood from the exploded view of FIG. 3, each workpiece tooling assembly 25, 30, 35, 40 of this particular embodiment includes a hollow mounting tube 60 that surrounds a corresponding portion of a shaft 35. Bearings 135, bushings 110 and/or similar components may reside between the shaft 35 and the mounting tube 60 of each workpiece tooling assembly 25, 30, 35, 40 to facilitate selective rotation of the workpiece tooling assemblies about the shafts. In this particular embodiment, tooling mounting plate support ribs 65 also extend from the mounting tube 60 to assist with the support and attachment of the workpiece tooling assembly tooling mounting plates P.

Each workpiece tooling assembly 25, 30, 35, 40 may be provided with multiple locking positions that properly orient each face a, b, c thereof to support a different workpiece. To this end, the mounting tube 60 of each workpiece tooling assembly 25, 30, 35, 40 is associated with a spring-locking assembly 70 that maintains the associated workpiece tooling assembly in a selected locked position unless a deliberate unlocking force is applied thereto.

Figures 3A, 3B:
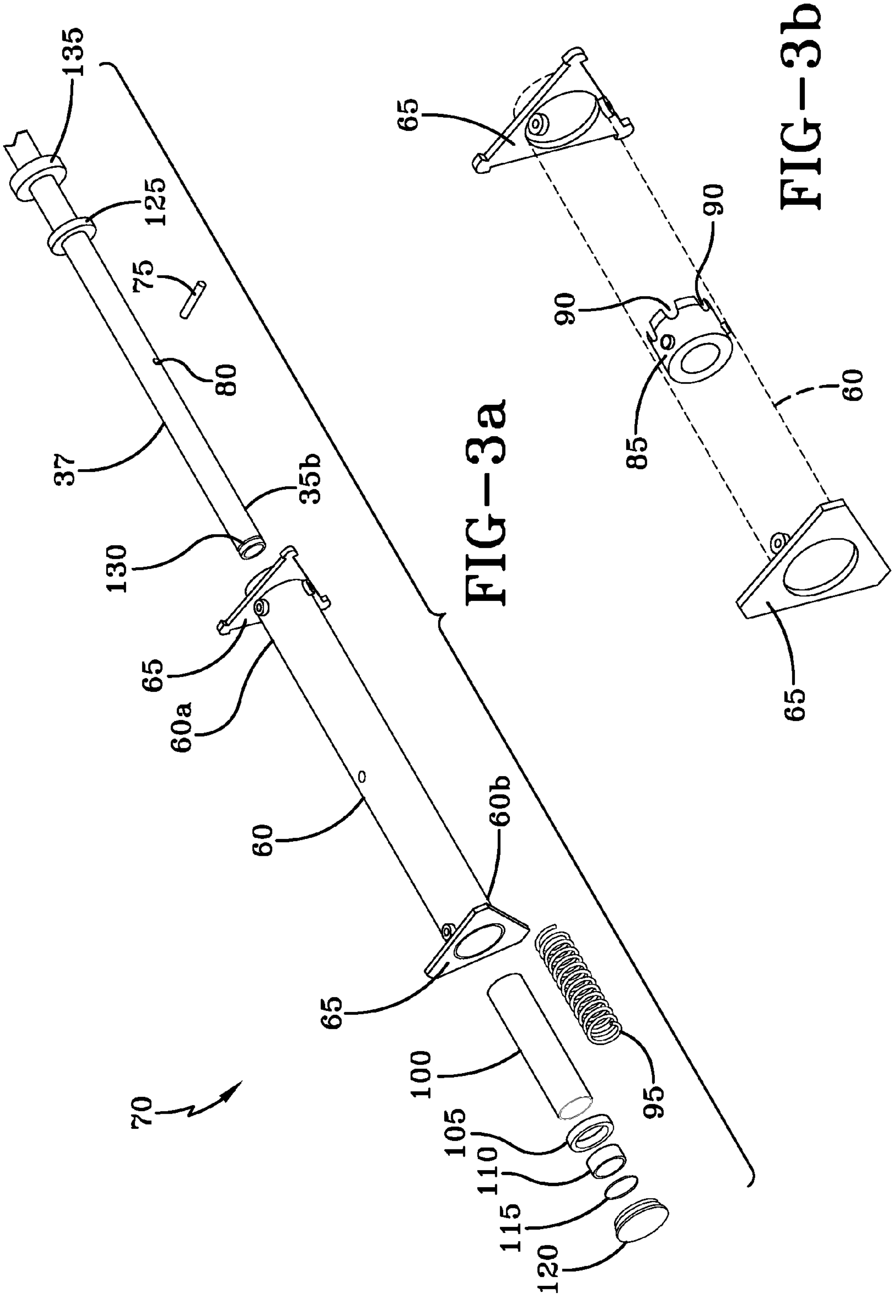
FIG. 3*a* is an exploded view of a portion of an exemplary rotatable workpiece tooling assembly as shown on the fixture of FIG. 1.
FIG. 3*b* is a partially transparent view of a hollow tube portion of the rotatable workpiece tooling assembly of FIG. 3*a*, wherein a pin engaging element is visible.

As shown in FIGS. 3*a*-3*b*, this embodiment of the spring-locking assembly 70 includes a lock pin 75 that is retained in a corresponding hole 80 in a respective portion of a shaft 35. A cooperating lock pin engaging element 85 (see FIG. 3*b*) is affixed to the interior of the mounting tube 60 at a position that permits selective engagement of the lock pin engaging element and the lock pin 75 when the mounting tube is properly assembled to the shaft 35 (as described below). As shown, the lock pin engaging element 85 is provided with a plurality of slots 90 that selectively engage the lock pin 75 to lock the rotational position of an associated workpiece tooling assembly. The number of slots 90 may vary. Generally, however, there will be a slot for each face present on a given workpiece tooling assembly. It may be possible to use a conventional castle nut for this purpose.

Referring to FIG. 3*a*, it can be observed that the spring-locking assembly 70 also includes a spring 95, a travel limit tube 100, a spring retainer 105, a rotator bushing 110, a retaining element (e.g., snap ring) 115 and an end cap 120. The rotationally lockable workpiece tooling assembly is assembled by first sliding a proximal end 60*a* of the mounting tube 60 over an associated shaft portion 35 until the lock pin 75 engages a slot 90 in the lock pin engaging element 85. Next, the spring 95 is placed inside the travel limit tube 100 and the combined components are inserted through the distal end 60*b* of the mounting tube until the leading ends of both elements contact the lock pin engaging element 85. The length of the spring 95 is greater than the length of the travel limit tube 100. Therefore, when the spring is subsequently compressed and confined within the travel limit tube 100 (as described below), the spring will exert an inwardly (proximally) directed biasing force against the lock pin engaging element 85 and, thus, the mounting tube 60.

The spring retainer 105 follows the spring 95/travel limit tube 100 assembly into the mounting tube 60. Preferably, the spring retainer 105 has an exterior dimension (e.g., diameter) that approximates the inner dimension (e.g., diameter) of the mounting tube 60, while still allowing the spring retainer to be inserted into the mounting tube without excessive interference. Preferably, the spring retainer 105 also includes a central bore that allows a portion of the rotator bushing 110 to pass through the spring retainer and into the open distal end of the travel limit tube 100. The spring retainer 105 is thus rotatably mounted on the rotator bushing 110. In order to further facilitate rotation of the mounting tube 60 and the overall workpiece tooling assembly associated therewith, a bearing 135, a bushing or a similar rotation-facilitating component may be located on the shaft 35 so as to be received within the mounting tube 60 near its proximal end 60*a* once the mounting tube is installed to the shaft (see FIG. 3*a*).

Once the aforementioned components have been installed as described above, the spring 95/travel limit tube 100 assembly, spring retainer 105 and rotator bushing 110 are retained within the mounting tube 60 and on the shaft 35 by the snap ring 115. As shown, the snap ring 115 is received in a snap ring groove 130 located near a distal end 35*b* of the respective shaft 35. Installing the snap ring will require a compression of the spring 95 into the travel limit tube 100. Therefore, as mentioned above, when the mounting tube 60 and its spring-locking assembly 70 components are fully installed, the spring 95 will exert a proximally-directed biasing force on the mounting tube and associated workpiece tooling assembly.

Once the spring-locking assembly 70 has been installed, the open end of the mounting tube 60 may be optionally closed with the end cap 120. While not essential to the present invention, it should be realized that the use of the end cap 120 or a similar element may inhibit or prevent debris from entering the interior of an associated workpiece tooling assembly. To that end, an optional shield 135 may also be affixed to the shaft 35 at a location that will help prevent dust, debris, overspray, etc., from entering the mounting tube 60 at its proximal end 60*a*. Alternatively, such a shield could be attached to the mounting tube 60 itself.

With the spring-locking assembly 70 and mounting tube 60 installed to a shaft 35, as described above, an associated workpiece tooling assembly 25, 30, 35, 40 may be rotated to a new position by simply applying thereto an outward pulling force (i.e., a distally directed pulling force) that is sufficient to overcome the biasing force of the spring 95 and to withdraw the lock pin engaging element 85 from the lock pin 75. This allows the associated workpiece tooling assembly to be freely rotated to the desired position. Overall linear movement of the workpiece tooling assembly is limited by the length of the travel limit tube 100.

Once the desired face a, b, c of the workpiece tooling assembly has been rotated into a proper/desired support position, releasing the outward pulling force allows the spring 95 to return the workpiece tooling assembly in a proximal direction, thereby causing a corresponding one of the lock pin engaging element slots 90 to engage the lock pin 75 and to lock the workpiece tooling assembly in the selected rotational position. It should be understood in this regard, that the lock pin engaging element 85 should at least be provided with a slot 90 that corresponds in location to the desired locked position of each face of the associated workpiece tooling assembly. Additional slots may also be provided if it is desired to permit some variation in the locked position of one or more of the workpiece tooling assembly faces. In any event, this unlocking-rotation-relocking process can be quickly and easily repeated any time it is desired to support a different workpiece.

Figure 4:
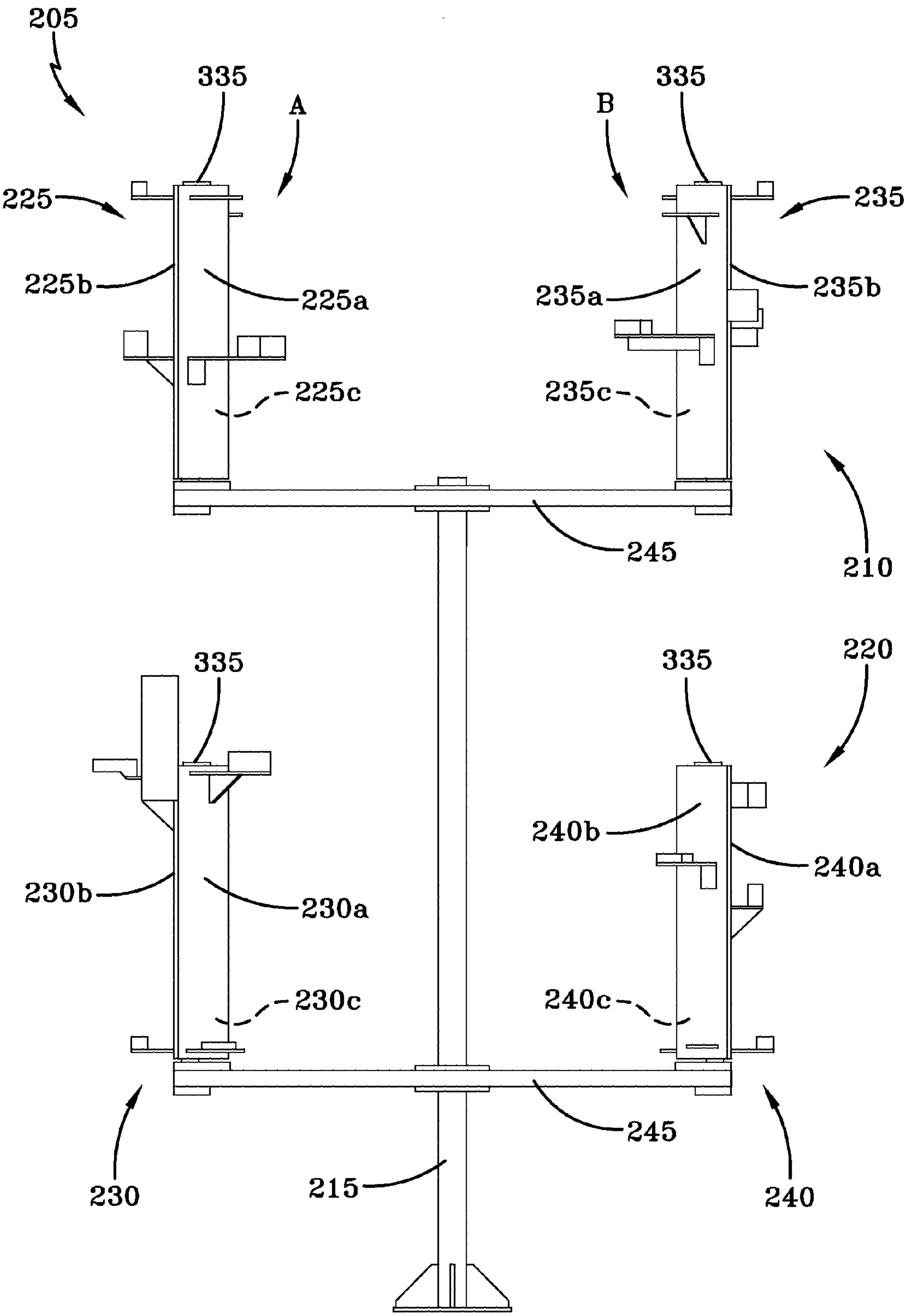
FIG. 4 is a front view of another exemplary embodiment of a fixture of the present invention.
Figure 5:
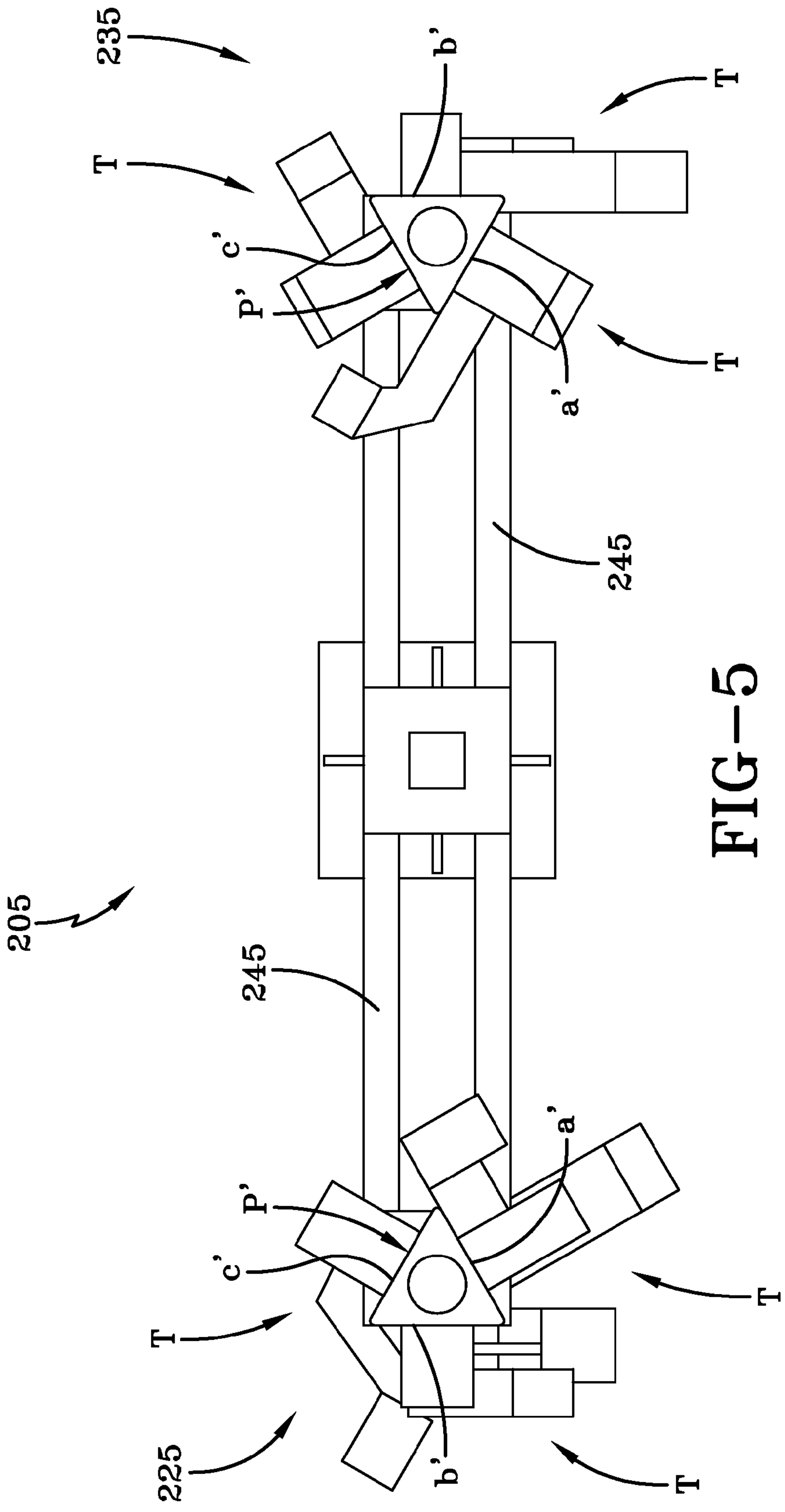
FIG. 5 is a top view of the fixture of FIG. 4.

Another exemplary embodiment of a fixture for selectably holding dissimilar workpieces ("fixture") 205 of the present invention is illustrated in FIG. 4. As shown, the fixture 205 includes a framework 210. As with the embodiment of the fixture of FIG. 1, the overall framework of this exemplary fixture may vary considerably in design, size and shape. The framework 210 of this exemplary embodiment again includes a central and substantially vertical support member 215 for supporting the fixture from a floor or another structure. In an alternative embodiment, the fixture 205 may be supported by overhead suspension.

To the vertical support member 215 of this particular fixture 205 is connected a substantially vertically-oriented support frame 220—in contrast to the substantially horizontally-oriented support frame of the fixture of FIG. 4. As would be appreciated by one of skill in the art, this support frame 220 may also be constructed from various materials such as metallic tubing, and angle materials. The materials used in this regard, as well as the specific method of construction and the size and shape of the support frame 220, may vary depending on the workpieces and/or application with which the fixture will be used.

The exemplary fixture 205 shown in FIG. 4 is divided into two vertical support sections A, B, the centerline of which, in this case, essentially runs axially through the vertical support member 215. Each support section A, B is designed to support a given workpiece (see FIGS. 6-7) in a vertical orientation. As with the fixture of FIG. 1, this exemplary fixture may also have less than the two support sections shown in this exemplary embodiment, or may have more than two such support sections.

Each support section includes a pair of individual multi-sided, rotatable workpiece tooling assemblies 225-230, 235-240 that are supported by the framework 210. In this case, the rotatable workpiece tooling assemblies 225, 230, 235, 240 are rotatably supported on individual shafts 335 that extend vertically from or through a pair of substantially horizontally oriented support arms 245. The support arms 245 of this design are connected to and supported by the vertical support member 215. Other fixtures of the present invention may utilize alternative rotatable workpiece tooling assembly support designs.

Figure 7:
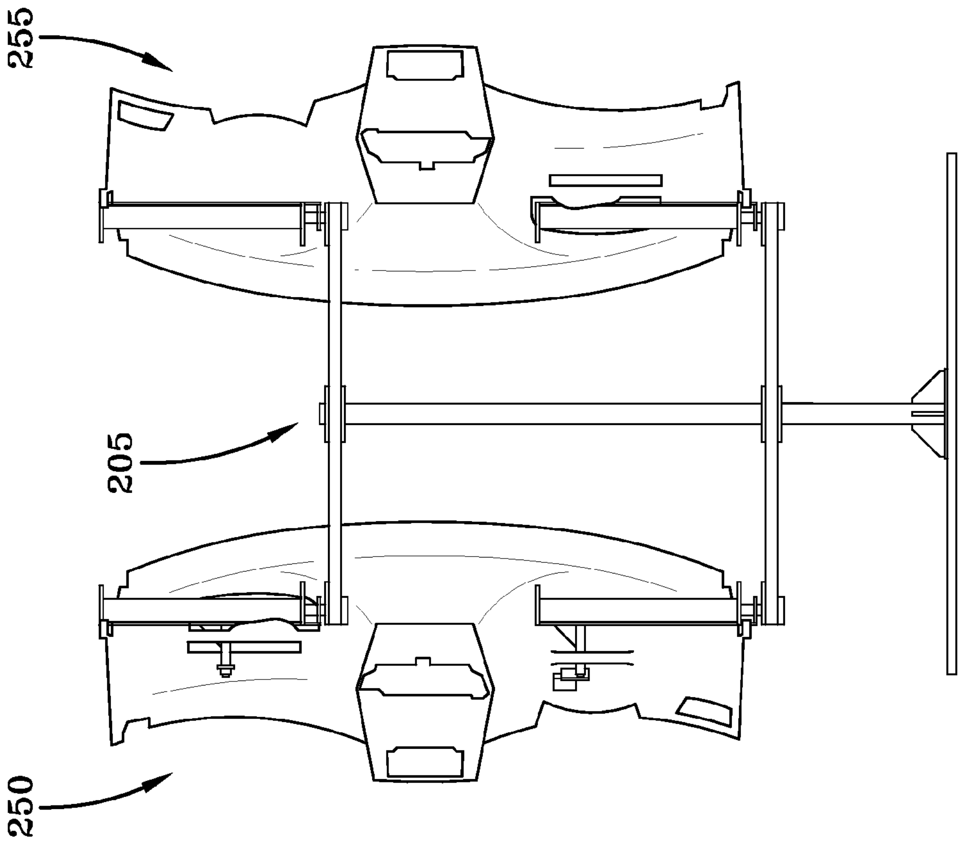
FIG. 7 is a front view of the fixture of FIG. 4, with two workpieces simultaneously supported thereon.
Figure 6:
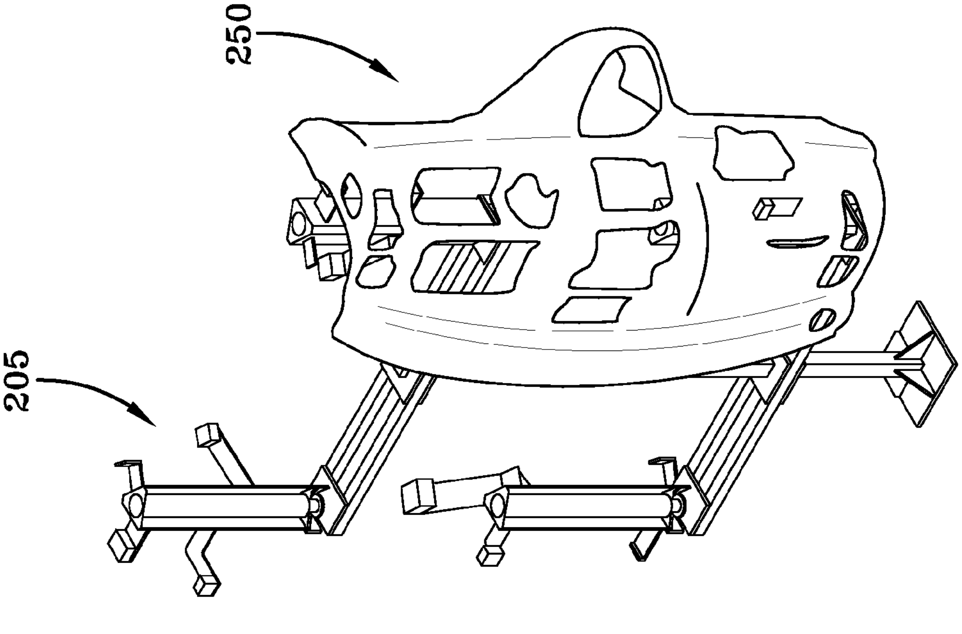
FIG. 6 is a perspective view of the fixture of FIG. 4, with a workpiece supported thereon.

The pairs of rotatable workpiece tooling assemblies 225-230, 235-240 associated with each support section A, B cooperate to support a given workpiece, such as the vehicle instrument panel foundations 250, 255 illustrated in FIGS. 6-7. While instrument panel foundations 250, 255 are shown for purposes of illustration in FIGS. 6-7, it is to be understood that a fixture of the present invention is not constrained for use with any particular type of workpiece. Rather, it should be apparent that such a fixture could be used to support a variety of different types of workpieces.

Each rotatable workpiece tooling assembly 225, 230, 235, 240 of this embodiment includes three distinct tooling mounting sides (faces) 225*a*-225*c*, 230*a*-230*c*, 235-235*c*, 240*a*-240*c*. A lesser or greater number of tooling mounting faces are also possible in other embodiments. Each tooling mounting face a', b', c' of the workpiece tooling assemblies 225, 230, 235, 240 of this embodiment is shown to include a tooling mounting plate P' to which is attached support tooling T for supporting an instrument panel foundation. In lieu of a tooling plate, other support tooling connection elements may be provided, and the present invention is not limited to any particular support tooling connection technique. Depending on the workpiece(s) to be supported by the fixture 205, the support tooling on the same tooling mounting face (e.g., the "a" face) of an associated pair of workpiece tooling assemblies 225-230, 235-240 may be substantially identical and may be arranged in a mirrored orientation as described above with respect to the fixture of FIG. 1. Alternatively, the support tooling installed to each of an associated pair of workpiece tooling assemblies 225-230, 235-240 of this exemplary fixture 205 may be partially or wholly dissimilar and/or may lack the mirrored orientation depicted in FIG. 1.

As described above with respect to the fixture of FIG. 1, each workpiece tooling assembly 225-230, 235-240 can be selectively rotated and locked into a support position that corresponds with a particular workpiece to be operated on. The particular workpiece tooling assemblies 225-230, 235-240 of this embodiment are adapted to support up to three different workpieces, but that number may vary.

Each workpiece tooling assembly 25, 30, 35, 40 of this particular embodiment again includes a hollow mounting tube 260 that surrounds a corresponding portion of a shaft 335. Bearings 345, bushings 310 and/or similar components may reside between the shaft 335 and the mounting tube 260 of each workpiece tooling assembly 225, 230, 235, 240 to facilitate selective rotation of the workpiece tooling assemblies about the shafts. In this particular embodiment, tooling mounting plate support ribs 265 extend from the mounting tube 260 to assist with the support and attachment of the workpiece tooling assembly tooling mounting plates P'.

Each workpiece tooling assembly 225, 230, 235, 240 may be provided with multiple locking positions that properly orient each face a', b', c' thereof to support a different workpiece. To this end, the mounting tube 260 of each workpiece tooling assembly 225, 230, 235, 240 is associated with a releasable locking assembly. While the releasable locking assembly used in this embodiment may the same as or similar to the releasable locking assembly used with the fixture of FIG. 1, this particular exemplary fixture employs a spring-loaded cam-locking assembly 270 that maintains the associated workpiece tooling assembly in a selected locked position unless a deliberate unlocking force is applied thereto.

Figure 8:
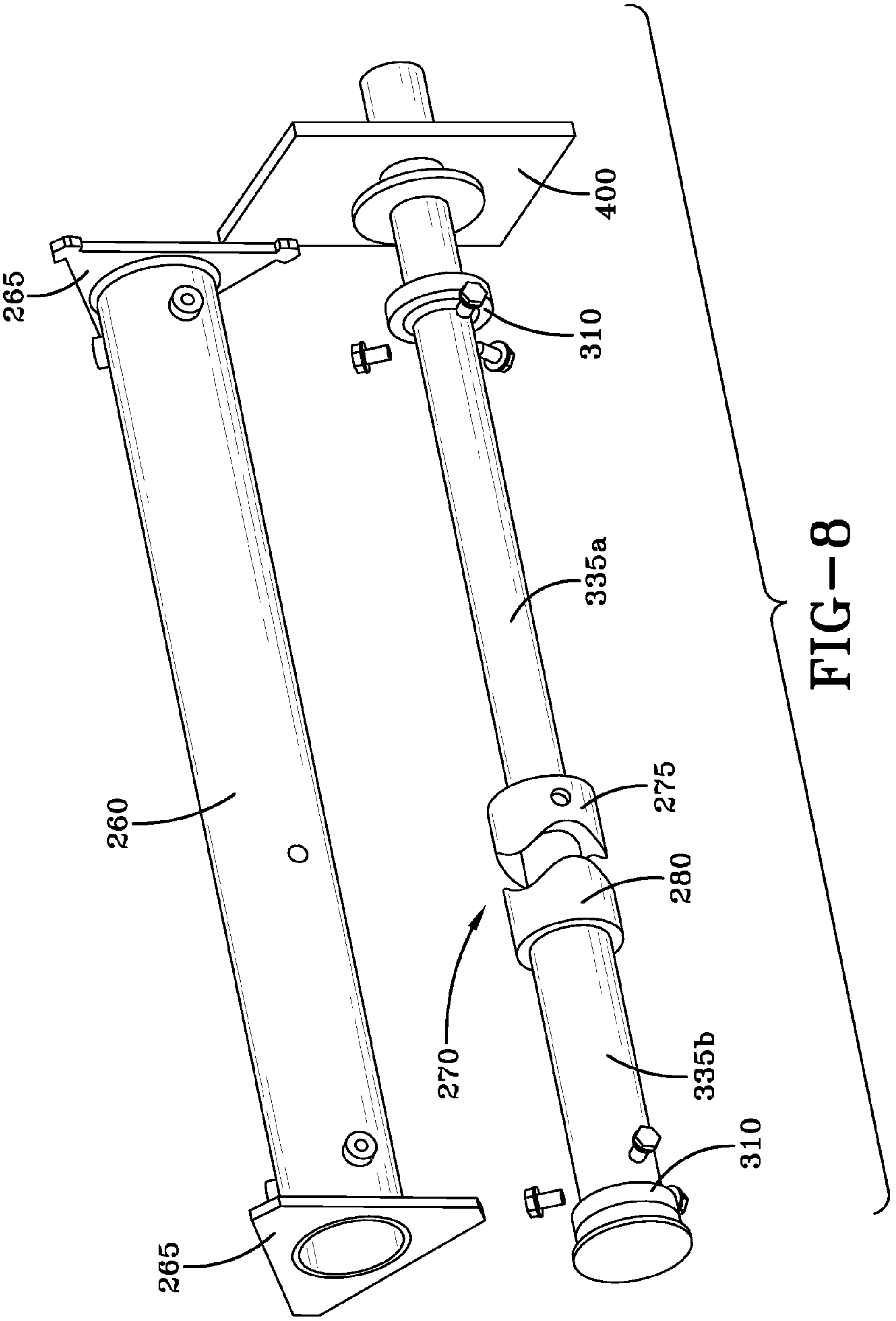
FIG. 8 is an exploded view of a portion of an exemplary rotatable workpiece tooling assembly of the fixture of FIG. 4.
Figure 9:
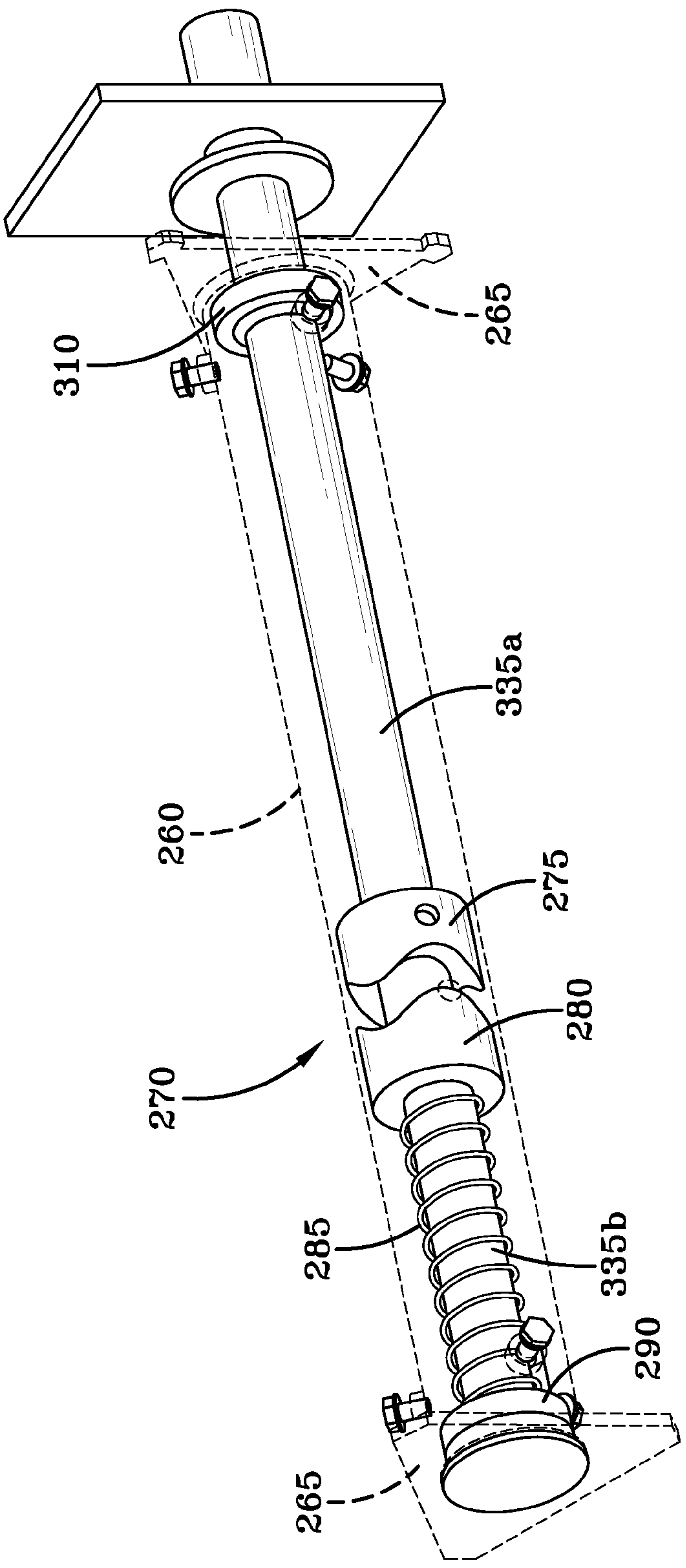
FIG. 9 is a partially transparent view of a hollow tube portion of the rotatable workpiece tooling assembly of FIG. 8, wherein a cam mechanism is visible.

As shown in FIGS. 8-9, this embodiment of the cam-locking assembly 270 includes a two-piece shaft 335 having a fixed portion 335*a* and a rotating portion 335*b*. The fixed portion 335*a* of the shaft is affixed to and may extend through a mounting plate 400 that can be used to mount the workpiece tooling assemblies 225, 230, 235, 240 to the support arms 245 of the fixture. The rotating portion 335*b* of the shaft is substantially hollow and has an inner diameter of sufficient size to receive a free end of the fixed portion 335*a* of the shaft. Thus, the rotating portion 335*b* of the shaft is rotatable about the fixed portion 335*a* of the shaft.

The cam-locking assembly is also shown to include a pair of engaging cam elements 275, 280 that are respectively mounted to the fixed portion 335*a* and rotating portion 335*b* of the shaft 335. It can be seen that the cam elements 275, 280 have a cooperating cam profile and are located to reside in an engaged arrangement when the cam-locking assembly 270 is properly assembled.

Referring to FIG. 9, it can be observed that the cam-locking assembly 270 also includes a spring 285 that is trapped between a spring retainer 290 associated with the fixed portion 335*a* of the shaft 335. The spring 285 and rotating portion 335*b* of the shaft may be held in place by an end cap 295 or a similar element. In this manner, the spring 285 pushes the rotating portion 335*b* of the shaft toward the fixed portion 335*a* of the shaft such that the cam elements 275, 280 are maintained in an engaged relationship absent the application of an overwhelming rotational force.

Referring now to FIG. 9, it can be understood that the hollow mounting tube 260 is installed over the assembled shaft portions 335*a*, 335*b*. To this end, the cam-locking assembly 270 of this embodiment may also include other elements such as bushings, etc., that are used to retain the hollow mounting tube on the shaft 335 and/or to facilitate rotation of the hollow mounting tube on the shaft. Such components may be similar to or different from the components described with respect to the fixture of FIG. 1, and may also include elements such as shields to inhibit or prevent dust, debris, overspray, etc., from entering the interior of an associated workpiece tooling assembly.

It should be apparent from FIGS. 8-9 that once the cam-locking assembly 270 and mounting tube 260 have been assembled, the cam-locking assembly will function to maintain the rotational orientation of the associated workpiece tooling assembly 225, 230, 235, 240 until a given workpiece tooling assembly is deliberately rotated to a new position by a user (or some automated means).

More specifically, with the cam-locking assembly 270 and mounting tube 260 installed to a shaft 335, as described above, an associated workpiece tooling assembly 225, 230, 235, 240 is held in a given rotational orientation by the spring-biased engagement of the cam elements 275, 280. However, when desired, the workpiece tooling assembly 225, 230, 235, 240 may be rotated to a new position by simply grasping and rotating the mounting tube 260 (or some element attached thereto) with a force sufficient to overcome the force of the spring 285 and to rotate the cam element 280. As shown, the cam elements 275, 280 are provided with a lobe profile that results in cam engagement at points that correspond to desired rotational positions of the workpiece tooling assembly faces a', b', c'. This allows a given workpiece tooling assembly to be maintained in an existing position, but also to be rotated to a desired new position. This deliberate rotation of the workpiece tooling assemblies can be quickly and easily repeated any time it is desired to support a different workpiece.

It should be understood that a fixture of the present invention may be designed to support various numbers of different workpieces. The number of workpieces that can be supported by a single fixture may be greater or less than the number of different workpieces that may be supported by the exemplary fixtures shown and described herein. Consequently, a workpiece tooling assembly of the present invention may be provided with various numbers of separate and selectable sides, so as to support a desired number of workpieces. The number of workpieces that can be supported by a single fixture of the present invention may depend on a number of factors including, for example, the size and/or shape of the workpieces to be supported, the size and/or shape of the associated tooling required to support each workpiece, the allowable size of the overall fixture, etc.

It should be further understood that a single fixture of the present invention may be equipped with various numbers of support sections and associated workpiece tooling assemblies. Thus, while the exemplary fixtures are shown and described herein as having two separate support sections, each having a pair of cooperating rotatable workpiece tooling assemblies, a fixture of the present invention may be provided with a greater or lesser number of support sections, each of which may have a greater or lesser number of rotatable workpiece tooling assemblies. For example, in a simplistic version of the present invention, a fixture may be constructed with only a single support section having only a single rotatable workpiece assembly with two or more faces.

When multiple support sections are present, the workpiece tooling assemblies associated therewith may be equipped with support tooling to simultaneously support dissimilar workpieces, such as the front and rear bumper fascias of FIGS. 2*a*-2*d*. Alternatively, when multiple support sections are present, the workpiece tooling assemblies associated therewith may be equipped with support tooling to simultaneously support identical workpieces (e.g., a plurality of rear bumper fascias or instrument panel foundations). As should be obvious from the foregoing description, it is also possible to simultaneously support workpieces that are dissimilar not only in type (e.g., a front and rear bumper fascia for a particular vehicle), but also in design/use (e.g., instrument panel foundations for different vehicles). A number of different workpiece combinations may be supported.

Regardless of the specific design of a fixture of the present invention, no actual changing of support tooling is required. Rather, all or substantially all support tooling remains with an associated face of the workpiece tooling assemblies. Consequently, when moving from one workpiece to another while using a fixture of the present invention, the only modification required is a simple rotation of a workpiece tooling assembly or assemblies.

While certain embodiments of the present invention are described in detail above, the scope of the invention is not to be considered limited by such disclosure, and modifications are possible without departing from the spirit of the invention as evidenced by the following claims:

What is claimed is:

1. A fixture for selectably supporting dissimilar workpieces in a substantially vertical orientation, comprising:

a framework attached to a vertical support member;

at least one vertically extending support shaft affixed to said framework;

at least one workpiece tooling assembly rotatably coupled to said framework by said at least one vertically extending shaft, said at least one workpiece tooling assembly having two or more separate faces that are each selectably rotatable to a workpiece support position;

workpiece support tooling mounted to at least two of said two or more separate workpiece tooling assembly faces; and a cam-locking assembly that releasably locks each workpiece tooling assembly in a support position associated with a given face thereof, wherein each workpiece tooling assembly includes a hollow tube surrounding and rotatably mounted to a portion of said support shaft that is attached to said framework.

2. The fixture of claim 1, wherein said cam-locking assembly comprises a hollow mounting tube that surrounds a shaft having a rotating portion that is rotatable about a fixed portion, the cam-locking assembly further including engageable cam elements on each of the rotating and fixed shaft portions and a spring for biasing the cam elements toward an engaged position.

3. The fixture of claim 2, wherein said cam-locking assembly is unlockable by applying a rotational force to said workpiece tooling assembly, said force sufficient in magnitude to overcome the biasing force of said spring and to disengage said cam elements.

4. A fixture for selectably supporting dissimilar workpieces in a substantially vertical orientation, comprising:

a framework attached to a vertical support member and having at least one defined support section;

at least one vertically extending shaft affixed to said framework;

at least one workpiece tooling assembly associated with each support section and rotatably coupled to said framework thereof by said at least one vertically extending shaft, said at least one workpiece tooling assembly having two or more separate faces that are each selectably rotatable to a workpiece support position;

workpiece support tooling mounted to each face of said at least one workpiece tooling assembly; and a locking assembly that releasably locks each workpiece tooling assembly in a support position associated with a given face thereof, wherein each workpiece tooling assembly includes a hollow tube surrounding and rotatably mounted to a portion of said support shaft that is attached to said framework, and wherein said locking assembly is a cam-locking assembly that includes said hollow mounting tube and wherein said support shaft has a rotating portion that is rotatable about a fixed portion, the cam-locking assembly further including engageable cam elements on each of the rotating and fixed shaft portions and a spring for biasing the cam elements toward an engaged position.

5. The fixture of claim 4, wherein said cam-locking assembly is unlockable by applying a rotational force to said workpiece tooling assembly, said force sufficient in magnitude to overcome the biasing force of said spring and to disengage said cam elements.

6. A fixture for selectably supporting a plurality of dissimilar workpieces in a substantially vertical orientation, comprising:

a framework attached to a vertical support member and having a plurality of separate support sections defined by a vertical plane(s) passing through said vertical support member, each support section having a pair of vertically spaced support arms;

a vertically extending support shaft affixed to each support arm;

a cooperating pair of rotatable workpiece tooling assemblies associated with each support section, individual workpiece tooling assemblies of each workpiece tooling assembly pair located on similarly sided support arms of said framework and including a hollow mounting tube portion that is rotatably coupled to said support shaft affixed thereto;

at least two separate support tooling mounting faces on each workpiece tooling assembly, each face being selectably placeable in a workpiece support position by rotation of the associated workpiece tooling assembly;

workpiece support tooling mounted to a tooling mounting plate located on each face of said workpiece tooling assemblies, workpiece support tooling mounted to similar faces of said pairs of rotatable workpiece tooling assemblies being designed to cooperatively and simultaneously support a single workpiece; and a cam-locking assembly that releasably locks each workpiece tooling assembly in a support position associated with a given face thereof.

7. The fixture of claim 6, wherein said cam-locking assembly includes said hollow mounting tube, and wherein said support shaft has a rotating portion that is rotatable about a fixed portion, the cam-locking assembly further including engageable cam elements on each of the rotating and fixed shaft portions and a spring for biasing the cam elements toward an engaged position.

8. The fixture of claim 7, wherein said cam-locking assembly is unlockable by applying a rotational force to said workpiece tooling assembly, said force sufficient in magnitude to overcome the biasing force of said spring and to disengage said cam elements.

9. The fixture of claim 6, wherein said workpiece support tooling is designed to support different bumper fascias.

10. The fixture of claim 6, wherein said workpiece support tooling is designed to support different vehicle instrument panel foundations.

* * * * *